United States Patent [19]

Muzzio

[11] 4,137,398

[45] Jan. 30, 1979

[54] PROCESS FOR THE REMOVAL OF CATALYST FROM POLYETHER POLYOL

[75] Inventor: John A. Muzzio, Taylor, Mich.

[73] Assignee: BASF Wyandotte Corporation, Wyandotte, Mich.

[21] Appl. No.: 914,024

[22] Filed: Jun. 9, 1978

[51] Int. Cl.$^2$ .......................... C07C 3/00; C07H 1/06; C07C 41/12
[52] U.S. Cl. ...................................... 536/4; 260/571; 260/570 D; 260/573; 260/584 B; 536/120; 544/398; 544/401; 544/383; 568/621; 568/608; 568/620
[58] Field of Search ............ 260/611 B, 615 B, 613 B, 260/570 D, 573, 584 B, 616; 536/4, 120; 544/398, 401, 383

[56] References Cited

U.S. PATENT DOCUMENTS

| | | | |
|---|---|---|---|
| 2,448,664 | 9/1948 | Fife et al. | 260/615 B |
| 2,496,582 | 2/1950 | Enyeart | 260/615 B |
| 4,029,879 | 6/1977 | Muzzio | 260/615 B |

FOREIGN PATENT DOCUMENTS 4,533,194  10/1970  Japan .................... 260/615 B

*Primary Examiner*—Howard T. Mars
*Attorney, Agent, or Firm*—Robert J. Henry; Bernhard R. Swick; Robert E. Dunn

[57] ABSTRACT

An improvement in the process of alkaline catalyst removal from crude polyoxyalkylene ether polyols is achieved by treating a mixture of crude polyol, adsorbent, and water with magnesium carbonate and carbon dioxide just prior to filtration.

5 Claims, No Drawings

PROCESS FOR THE REMOVAL OF CATALYST FROM POLYETHER POLYOL

BACKGROUND OF THE INVENTION

1. Field of the Invention

Polyoxyalkylene ether polyols, hereinafter for convenience called polyols, are commonly used in the production of urethane polymers. These polyols are reacted with polyisocyanate in the presence of added catalyst and other materials to produce urethane polymers which may be in the form of rubber-like elastomers, flexible or rigid foams and the like. In order that urethane polymers of desired properties and characteristics be produced, it is important that the polyols to be reacted with the polyisocyanate are essentially free of impurities because these impurities may function as undesirable catalysts or otherwise cause undesirable effects in the urethane polymer reaction.

Crude polyols, as commercially prepared, contain various impurities such as alkali metal hydroxide, or other metal salts which were employed as catalysts for the production of polyols. The normal concentrations of catalysts range from 1700 to 4000 parts per million. It is desirable to reduce this to a level of about 5 parts per million or less.

2. Prior Art

One of the commercial practices for the removal of these impurities involves acid neutralization of the alkali forming insoluble salts and removal of same by filtration. Centrifugation, employing mixtures of polyol, water, and solvent can also be employed for the removal of residual catalyst.

The crude polyols without prior neutralization of the catalyst can be treated with a synthetic type adsorbent followed by filtration of the polyol. Another commercial practice involves mixing the polyol and adsorbent with an amount of water ranging from 0.5 to 5.0 percent. Often the polyol quality suffers because of the risk of oxydizing the polyols due to exposure to air during the work-up. This causes the production of off-grade polyol by increasing undesirable acidity.

A number of patents disclose the use of various acidic materials for the neutralization of the alkali metal catalyst followed by filtration of the precipitated salts. Among these are U.S. Pat. Nos. 3,833,669; 3,053,903; 2,983,763; 2,448,664; and 3,016,404. U.S. Pat. No. 3,528,920 discloses the use of synthetic magnesium silicate as an adsorbent for the removal of catalyst from the various glycol ethers. However, this patent also discloses that the undesired alkaline catalyst is first neutralized with an acid prior to filtration. An improvement in efficiency of catalyst removal as described and claimed in U.S. Pat. No. 4,029,879 wherein a critical amount of water is added along with the adsorbent synthetic magnesium silicate prior to heating and filtration. In my copending application, Ser. No. 856,453, an improvement in the process resulting, inter alia, in reduced filtration time is achieved by the addition of carbon dioxide.

None of the prior art references recognizes that an appreciable reduction in the time required for the catalyst removal may be achieved by using a minimal amount of water followed by the addition of magnesium carbonate and then addition of carbon dioxide. In addition, the invention provides for the use of smaller amounts of adsorbent.

SUMMARY OF THE INVENTION

It has been discovered that an improvement in the process of catalyst removal during the preparation of polyols can be achieved by following the procedure wherein absorbent is added to the polyol, an amount of water from about 2.0 to 4.0 weight percent is added, the mixture heated at elevated temperatures for about 45 minutes, during which time, after about 30 minutes about 0.1 to about 0.3 weight percent of magnesium carbonate is added, followed by the addition of sufficient carbon dioxide to saturate the mixture at least 15 minutes prior to the filtration and removal of said catalyst.

DESCRIPTION OF THE PREFERRED EMBODIMENT

The improved process for the removal of residual alkaline catalyst involves the addition of about at least 0.3 weight percent adsorbent preferably at least 0.5 weight percent and at least 2 weight percent water based on the weight of the polyol, to the hot polyol contained in a suitable vessel. This mixture is then agitated for at least 45 minutes at temperatures ranging from about 80° Centigrade to about 130° Centigrade. Preferably the mixture temperature is about 100° Centigrade. Temperatures appreciably above 130° Centigrade can result in degradation of the polyol especially in the presence of air. This degradation causes the formation of acidic material which is very difficult to remove employing normal absorption filtration procedure and will make the polyol unsuitable for use in the production of urethane polymers. During the latter part of the heat treatment after the addition of water and adsorbent, from about 0.1 to about 0.3 percent magnesium carbonate, based on the weight of polyol, is added. Typically, the addition will take place at about 15 minutes prior to the end of the heat treatment. Thus, when 45 minutes of heating are used, the addition of magnesium carbonate will be made at the 30 minute point of the heating step.

The mixture is then treated with sufficient carbon dioxide gas to saturate the mixture. This addition of carbon dioxide is made at least 15 minutes after the magnesium carbonate is added and at least 15 minutes prior to the filtration of the mixture. The filtration temperature ranges from about 90° Centigrade to about 120° Centigrade, more preferably about 100° Centigrade. After filtration is complete, the polyol is stripped of water and other volatiles at temperatures ranging from about 80° Centigrade to about 130° Centigrade at 1–10 millimeters absolute of mercury pressure.

It has been found that the order of addition of the adsorbent, water, magnesium carbonate and carbon dioxide to the crude polyol is critical to the effectiveness of the improved process. Specifically, it has been found that it is critical to add the water with the adsorbent to the polyol crude, allowing the mixture to stir for about 45 minutes at about 100° Centigrade prior to the addition of carbon dioxide. In general, the magnesium carbonate is added during the latter part of this 45 minute period. If the magnesium carbonate is added prematurely, either before or substantially with the adsorbent the amount of catalyst removal is reduced, and filtration time is likely to be increased. However, the magnesium carbonate should be added prior to say the last 15 minutes of the heating step, or at least 15 minutes before the addition of carbon dioxide. The amount of magnesium carbonate added is critical and may vary from say 0.1 to 0.3 percent based on the weight of polyol with the exact amount varying somewhat with the polyol to be purified. Usually, the amount of magnesium carbonate will be about 0.2 percent by weight. In addition, it has been found that use of calcium carbonate, magnesium oxide or magnesium sulfate plug the filter.

If the carbon dioxide is added prematurely to the mixture the effectiveness of this addition is reduced. If it is added either with or before the addition of adsorbent water then the mixture is extremely difficult to filter. It then takes a considerably longer time to achieve sufficient catalyst removal. In some cases catalyst removal is incomplete under these conditions. The amount of carbon dioxide which is added must be such that saturation is achieved. Quantities below that will be insufficient to accomplish the desired objectives of the invention. Amounts of carbon dioxide beyond saturation are not necessary. It has also been found in the practice of this invention that smaller amount of adsorbents, i.e., about 0.5 weight percent, may be employed to satisfactorily remove the catalyst thus achieving a faster filtration rate and reducing the need for large capacity filters. The use of smaller amounts of adsorbent not only provide a saving in adsorbent, but also decrease the amount of polyol lost by removal along with adsorbent.

In general, the impurities present in the polyol which must be removed are catalysts used in the preparation of the polyol. These catalysts are generally alkali metal hydroxides or alkali metal alkoxides such as sodium hydroxide, potassium hydroxide, sodium alkoxide, potassium alkoxide, and so forth. Additional catalysts which may be employed in the preparation of such polyols and which may be removed by the instant process include the hydroxides and alkoxides of lithium, rubidium and cesium.

Generally speaking, the polyols purified in accordance with the present invention include those polyols prepared by condensing monomeric units such as ethylene oxide, propylene oxide, butylene oxide, and mixtures thereof with active hydrogen compounds such as ethylene glycol, propylene glycol, water, dipropylene glycol, trimethylene glycol, 1,2-butanediol, 1,3-butanediol, 1,4-butanediol, hexanetriol, glycerol, trimethylolpropane, trimethylolethane, hydroquinone, pentaerythritol, alpha-methylglucoside, sorbitol, sucrose, ethylenediamine, diethylenetriamine, toluenediamine, aniline, methylenedianiline, piperazine, triisopropanolamine, and bisphenol A wherein these polyols have a molecular weight range from about 700 to about 26,000 and are essentially water insoluble.

Included are those polyols which are characterized as being essentially hydroxyl-terminated polyether polyols which have the general formula:

wherein R is an alkylene radical and n is an integer which in a preferred embodiment is sufficiently large that the compound, as a whole, has a molecular weight from about 700 to about 26,000. These would include polyoxypropylene glycol and polyoxybutylene glycol. Other typical polyols include block copolymers, e.g., combination of polyoxypropylene and polyoxyethylene glycols, more specifically those having the general formula:

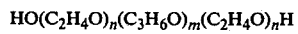

wherein n and m are together sufficient for attainment of the desired minimum molecular weight, that is, about 700, however, the polyols must be essentially water insoluble. Also included are block copolymers of butylene and ethylene oxides and butylene and propylene oxides and random copolymer glycols prepared from blends of two or more alkylene oxides as well as glycols as described above capped with the ethylene oxide units. The polyols purified in accordance with this invention can contain arylene or cycloalkylene radicals together with the alkylene radicals as, for example, in the condensation products of a polyoxyalkylene ether glycol with $\alpha,\alpha'$-dibromo-p-xylene in the presence of a catalyst. In such products the cyclic groups are preferably phenylene, naphthalene, or cyclohexylene radicals or those radicals containing alkyl or alkylene substituents as in the tolylene, ethylphenylene or dimethylxylylene radicals.

The adsorbents which can be employed in the practice of this invention are the synthetic magnesium silicate adsorbents. They may be prepared by the reaction of a magnesium salt such as magnesium sulfate with sodium silicate. The resulting products can have particle sizes ranging from 100 to 500 microns with an average particle size of about 325 microns. These adsorbents are sold under trademarks of "BRITESORB" by Philadelphia Quartz Corporation, and "MAGNESOL" by Reagent Chemicals. The amount of adsorbent which can be employed depends on the concentration of catalyst present in the polyol. Thus, amounts ranging from about 0.3 percent to about 5 percent by weight based on the weight of the polyol may be employed. Preferably, however, the concentration of adsorbent ranges from about 0.4 percent to about 2.0 percent based on the weight of polyol. More preferably, the concentration of adsorbent ranges from about 0.5 to about 1.0 weight percent based on the weight of the polyol. From an economical point of view it is preferable to use as little as possible of the adsorbent.

The following Examples are provided to further illustrate the invention. Parts and percents are by weight unless otherwise noted. In these Examples the Polyols designated by the letters, A, B, etc., are as follows:

Polyol A is a heteric propylene oxide-ethylene oxide adduct of glycerine having a molecular weight of 3600 and containing 11 percent by weight oxyethylene.

Polyol B is a heteric propylene oxide-ethylene oxide adduct of glycerine having a molecular weight of 3600 and containing 9 percent by weight oxyethylene.

Polyol C is a propylene oxide-ethylene oxide adduct of glycerine having a molecular weight of 3400 and containing 15 percent by weight oxyethylene.

Polyol D is a glycerine-propylene glycol coinitiated propylene oxide adduct including therein 0.3 moles allyl glycidyl ether per mole of polyol with 15 percent by weight of ethylene oxide added as a cap and having a molecular weight of 3900.

EXAMPLES 1–19

In the Examples below, 1500 grams of the designated crude polyol were treated with synthetic magnesium silicate adsorbent, water, magnesium carbonate and carbon dioxide employing the concentrations and times of addition as indicated below. The mixtures were stirred and heated at 100° Centigrade for the periods of time indicated below. To illustrate, in Example 1, 0.75 percent by weight of adsorbent, based on the weight of polyol, and 2.5 percent by weight water, based on the weight of polyol, were added to the crude polyol. The mixture was stirred and heated at 100° Centigrade for 30 minutes, 0.1 percent by weight of magnesium carbonate, based on the weight of the polyol, was added and the mixture was stirred and heated at 100° Centigrade for 15 minutes. Carbon dioxide gas was then added to the mixture until saturation was achieved. This mixture was then stirred for 15 minutes. The mixture was then filtered through a system composed of a Seitz No. 6 pressure filter fitted with a one-liter bomb to allow for greater filtration capacity. Forty-five pounds of pressure was applied and the filtration flow rate was measured at various intervals for one hour. The temperature of the mixture was maintained at 100° Centigrade by using a heating tape on the bomb and a heating lamp on the pressure filter. The residual catalyst concentration in the filtered polyol was determined by an alkalinity titration. All of the subsequent examples were treated in a similar manner in the order indicated. The results obtained indicate that improved filtration rates or improved catalyst removal or a combination of both are obtained when 0.4 to 1.5 percent adsorbent is employed with water and a heat treatment together with addition of from 0.1 to 3 percent magnesium carbonate and a subsequent treatment of carbon dioxide at least 15 minutes prior to filtration.

Table

| Ex. | Polyol | Treatment | | Filtration Time (Min.) | Alk. as K ppm |
|---|---|---|---|---|---|
| 1 | A | 0.75% | BRITESORB | 30 min. | 8 | 2.0 |
|   |   | 2.5% | water | | | |
|   |   | 0.1% | $MgCO_3$ | 15 min. | | |
|   |   |      | $CO_2$ | 15 min. | | |
| 2 | A | 1.5% | BRITESORB | | 9 | 4.9 |
|   |   | 2.5% | water | 1 hour | | |
| 3 | A | 0.3% | $MgCO_3$ | | 20 | 12.3 |
|   |   | 3.0% | water | 15 min. | | |
|   |   | 0.75% | BRITESORB | 30 min. | | |
|   |   |      | $CO_2$ | 15 min. | | |
| 4 | A | 0.5% | BRITESORB | | slow | 2.6 |
|   |   | 2.5% | water | 30 min. | | |
|   |   | 0.1% | $MgCO_3$ | 15 min. | | |
|   |   |      | $CO_2$ | 15 min. | | |
| 5 | B | 0.5% | BRITESORB | | 20 | 1.8 |
|   |   | 2.5% | water | 30 min. | | |
|   |   | 0.2% | $MgCO_3$ | 15 min. | | |
|   |   |      | $CO_2$ | 15 min. | | |
| 6 | B | 0.5% | BRITESORB | | 25 | 2.6 |
|   |   | 2.5% | water | 30 min. | | |
|   |   | 0.2% | $MgCO_3$ | 15 min. | | |
|   |   |      | $CO_2$ | 15 min. | | |
| 7 | B | 0.5% | BRITESORB | | 64 | 2.2 |
|   |   | 2.5% | water | 30 min. | | |
|   |   | 0.3% | $MgCO_3$ | 15 min. | | |
|   |   |      | $CO_2$ | 15 min. | | |
| 8 | B | 0.4% | BRITESORB | | 22 | 2.2 |
|   |   | 3.75% | Water | 30 min. | | |
|   |   | 0.3% | $MgCO_3$ | 15 min. | | |
|   |   |      | $CO_2$ | 15 min. | | |
| 9 | B | 0.5% | BRITESORB | | 12 | 2.7 |
|   |   | 3.75% | water | 30 min. | | |
|   |   | 0.2% | $MgCO_3$ | 15 min. | | |
|   |   |      | $CO_2$ | 15 min. | | |
| 10 | B | 0.5% | BRITESORB | | 17 | 5.3 |
|   |   | 5.0% | water | 30 min. | | |
|   |   | 0.2% | $MgCO_3$ | 15 min. | | |
|   |   |      | $CO_2$ | 15 min. | | |
| 11 | B | 0.5% | BRITESORB | | plugged filter slow | 5.1 |
|   |   | 2.5% | water | 30 min. | | |
|   |   | 0.2% | $MgCO_3$ | 30 min. | | |
| 12 | B | 0.5% | BRITESORB | | 100 | 1.8 |
|   |   | 2.5% | water | 30 min. | | |
|   |   | 0.2% | MgO | 15 min. | | |
|   |   |      | $CO_2$ | 15 min. | | |
| 13 | B | 1.5% | BRITESORB | | 18 | 3.1 |
|   |   | 2.5% | water | 1 hour | | |
| 14 | C | 0.5% | BRITESORB | | 12 | 3.3 |
|   |   | 3.0% | water | 30 min. | | |
|   |   | 0.2% | $MgCO_3$ | 15 min. | | |
|   |   |      | $CO_2$ | 15 min. | | |
| 15 | C | 0.5% | MAGNESOL | | 10 | 3.4 |
|   |   | 3.0% | water | 30 min. | | |
|   |   | 0.2% | $MgCO_3$ | 15 min. | | |
|   |   |      | $CO_2$ | 15 min. | | |
| 16 | C | 0.5% | BRITESORB | | plugged | 3.3 |
|   |   | 3.0% | water | 30 min. | | |
|   |   | 0.2% | $MgSO_4$ | 15 min. | | |
|   |   |      | $CO_2$ | 15 min. | | |
| 17 | C | 0.5% | BRITESORB | | plugged | 3.4 |
|   |   | 3.0% | water | 30 min. | | |
|   |   | 0.2% | $CaCO_3$ | 15 min. | | |
|   |   |      | $CO_2$ | 15 min. | | |
| 18 | D | 1.5% | BRITESORB | | 55 | 6.0 |
|   |   | 2.5% | water | 30 min. | | |
|   |   | 0.2% | $MgCO_3$ | 15 min. | | |
|   |   |      | $CO_2$ | 15 min. | | |
| 19 | D | 1.5% | BRITESORB | | 84 | 10.3 |
|   |   | 2.5% | water | 1 hour | | |

Examples 1 through 4 illustrate the use of the invention with a polyol which is satisfactorily purified by conventional methods (Example 2). However, Example 1 shows that the process of the invention provides a much better purification while using only one-half as much adsorbent. In addition, only 0.1 percent of magnesium carbonate is used. Example 3 illustrates that the proper order of addition of magnesium carbonate and adsorbent are necessary. Example 4 indicates that 0.5 percent adsorbent may not be enough with this polyol, however, the purification is good and the use of more water would be expected, as shown below, to improve the filtration time.

Examples 5 through 13 illustrate the invention with another polyol which is satisfactorily purified by conventional methods (Example 13). Examples 5 and 6 illustrate that improved purification is achieved with only one-third as much adsorbent. Examples 7 and 8 illustrate the use of 0.3 percent magnesium carbonate with good purification. The filtration time for Example 7 is poor, but Example 8 illustrates this factor is improved with additional water. It is noteworthy that Example 8 shows good results with only 0.4 percent adsorbent. Example 9 is similar to Examples 5 and 6 except that more water is used, and it is seen that the filtration time goes down whereas the purification is not as good. Example 10 uses still more water with poorer results than Example 9 with respect to both filtration time and purification. Example 11 shows that magnesium carbonate is not satisfactory unless combined with carbon dioxide and Example 12 shows that magnesium oxide is not a substitute for $MgCO_3$.

Examples 14 through 17 show certain variations in the procedure of the invention, and the results obtained under such comparative conditions. Examples 14 and 15 show the process according to the invention wherein 0.5 percent of two different commercially available adsorbents are used. Good results are obtained in both cases. Examples 16 and 17 are similar in procedure to Example 14, except that they use magnesium sulfate and calcium carbonate respectively instead of magnesium carbonate. In both cases, the filter plugged.

Examples 18 and 19 show a comparison between the procedure of the invention and the conventional procedure wherein the crude polyol is difficult to purify. As shown in Example 19, 1.5 percent adsorbent does not provide sufficient purity whereas the procedure (Example 18) according to the invention provides fair results using 1.5 percent adsorbent.

Thus it is seen that the procedure according to the invention provides improvements that will provide purification of polyols which are difficult to purify, and a cost saving in time and material or both.

The embodiments of the invention in which an exclusive property or privilege is claimed are defined as follows:

1. In the process for purifying crude polyoxyalkylene ether polyols containing residual catalyst impurities, said polyols having a molecular weight range of 700 to about 26,000, the improvement which comprises:
   (a) adding a synthetic magnesium silicate adsorbent and water forming a mixture with said crude polyol wherein the amount of adsorbent is from about 0.3 to 3.0 weight percent based on the weight of the polyol and the amount of water is from about 2.0 to 4.0 weight percent based on the weight of the polyol,
   (b) heating said mixture at a temperature range from about 80° Centigrade to about 130° Centigrade for at least 45 minutes,
   (c) adding from 0.1 to 0.3 percent, based on the weight of polyol of magnesium carbonate to the mixture during the latter portion of the heating step and at least 15 minutes prior to the end thereof,
   (d) adding sufficient carbon dioxide to saturate the water at least 15 minutes after the magnesium carbonate is added and at least 15 minutes prior to filtration, and
   (e) separating the polyol from the adsorbent by filtration at a temperature from about 90° C to about 120° C wherein the residual catalyst impurities are retained on the adsorbent.

2. The process of claim 1 wherein the polyols are prepared by condensing one or more of the group consisting of ethylene oxide, propylene oxide, butylene oxide and mixtures thereof in random or sequential addition with active hydrogen compounds selected from the group consisting of ethylene glycol, propylene glycol, water, dipropylene glycol, trimethylolpropane, trimethylolethane, hydroquinone, pentaerythritol, alpha-methylglucoside, sorbitol, sucrose, ethylenediamine, diethylenetriamine, toluenediamine, aniline, methylenedianiline, piperazine, triisopropanolamine, and bisphenol A said polyols being essentially water insoluble.

3. The process of claim 1 wherein the amount of adsorbent is from about 0.4 to 2.0 weight percent based on the weight of the polyol.

4. The process of claim 1 wherein the amount of adsorbent is from about 0.5 to about 1.0 weight percent based on the weight of the polyol.

5. The process of claim 1 wherein the temperature of the mixture in step (b) is about 100° Centigrade.

* * * * *